June 21, 1955 R. H. BAER 2,711,513
MODULATING SYSTEMS
Filed Oct. 20, 1952
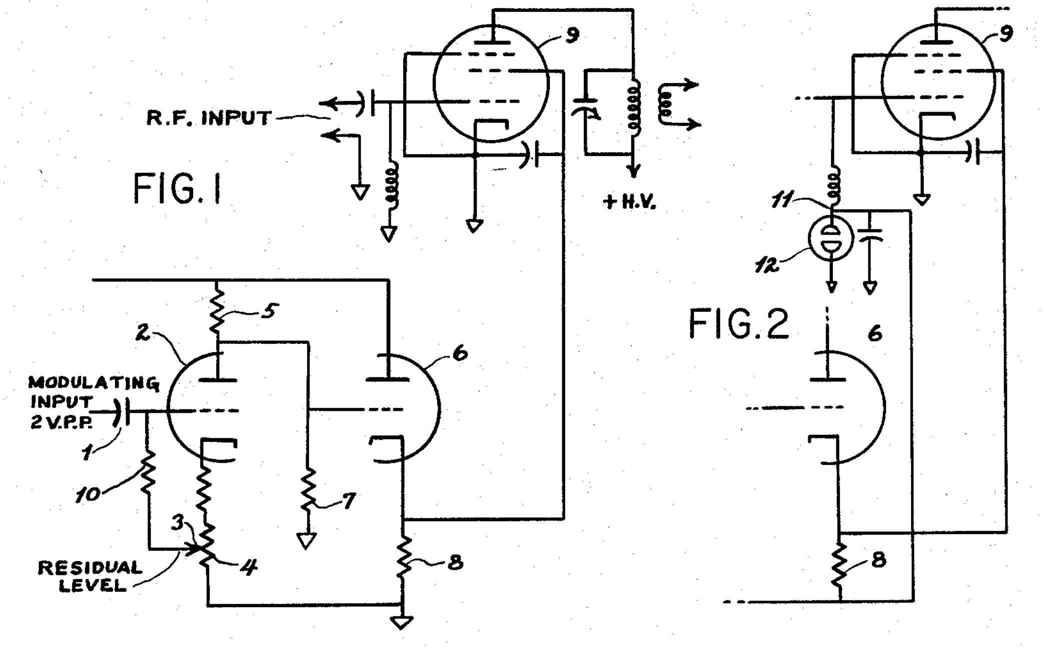
FIG. 1, FIG. 2
FIG. 3
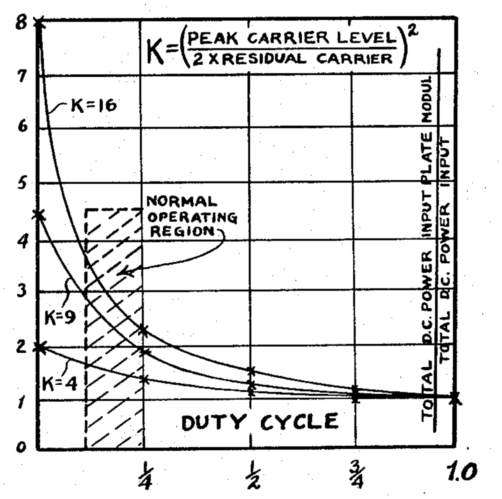
FIG. 5
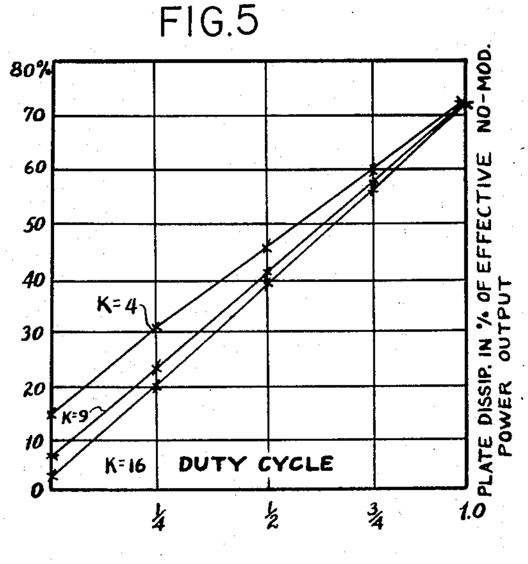
FIG. 4
| K | RESIDUAL CARRIER LEVEL | RESIDUAL CARRIER POWER |
|---|---|---|
| 4 | 0.250 PEAK MODUL. CARRIER LEVEL | 0.250 EFFECT. NO-MODUL. POWER |
| 9 | 0.165 " " " | 0.110 " " " |
| 16 | 0.125 " " " | 0.062 " " " |
INVENTOR.
RALPH H. BAER
BY Theodr Hafner
ATTORNEY 2,711,513
Patented June 21, 1955

2,711,513

MODULATING SYSTEMS

Ralph H. Baer, New York, N. Y., assignor to Transitron, Inc., New York, N. Y., a corporation of New York Application October 20, 1952, Serial No. 315,606

5 Claims. (Cl. 332—64)

This invention relates to an electric modulating system for the communication of intelligence and more specifically to the modulation of a high or radio frequency carrier by low frequency or audio signals.

One of the objects of this invention is the saving of space, weight and primary power requirements in present day communication equipment, especially in the field of airborne, mobile, transportable, and portable equipment.

A more specific object of the invention is a radio transmitter using voice or other intelligence for communication and reduced by at least fifty percent in bulk and weight and at least sixty percent in primary power (batteries and/or power supplies) requirements and yet giving equal or better results than known systems.

In plate-modulation systems commonly employed in audio modulation transmitters, power for the generation of the sidebands is supplied by the modulator. Under normal conditions of operation, the audio power must be delivered by the modulator in amounts to 0.5 times the D. C. plate input power to the modulated stage at one hundred percent modulation, necessitating the large tubes and components in the modulator circuit. Since the modulated tube operates at a constant efficiency of approximately 66% as opposed to a maximum possible efficiency of 40% at one hundred percent modulation obtainable with all low-level forms of modulation requiring only small audio powers, in accordance with this invention special techniques are employed to approach or exceed the overall efficiency of plate modulation, with the following advantages over usual type of plate-modulation in standard transmitters:

*a.* Reduction in physical size of the high-voltage and primary power requirements.

*b.* Elimination of all high power tubes and iron-core devices from the modulator circuit.

*c.* Reduction of modulator power requirements to negligible values.

*d.* Reduction of filament power required due to small modulator tube.

*e.* Elimination of the screen grid series dropping resistor (with a resultant power saving of 20–60 watts depending upon transmitter power).

*f.* Automatic, effective high-level splatterless speech-clipping, obtainable if desired by increasing audio gain.

*g.* Protection against overmodulation (carrier never forced beyond zero level).

In order to obtain these results, among others, the following features are characteristic of the invention.

1. Carrier level control.
2. D. C. coupled modulation circuitry.

It is therefore another object of the invention to provide a screen-grid modulation in which relatively low conversion-efficiency and normal speech duty cycle are combined to produce high overall efficiency, i. e. modulated power outputs equal to or greater than those obtainable with plate modulation from the same tube or tubes, but with reduced size requirements of all high-power components as detailed above.

It is a further object of the invention to hold the residual carrier level at no-modulation to some fixed fraction of peak modulation level, usually in the neighborhood of ¼ to ⅙, but also at zero level if required for special purposes such as increased secrecy requirements. In this way, the residual power level is maintained between $\frac{1}{16}$ and $\frac{1}{36}$ of peak modulation or ¼ to ⅙ the no-modulation power in a similar plate-modulated stage. Since in accordance with this invention this power level has only mathematical significance, it will be termed the effective no-modulation power output.

An an additional object of the invention, a residual carrier level is provided to facilitate tuning-in of the transmission at a receiving station.

These and other objects of the invention will be more fully apparent from the drawings annexed herewith in which Figure 1 represents a modulating circuit embodying certain features of the invention.

Fig. 2 represents a modified circuit.

Figs. 3, 4 and 5 represent operating characteristics and table respectively explaining the operation of the circuits shown in Figs. 1 and 2.

In Fig. 1 the modulating signal is shown to be applied through condenser 1 to the grid of low frequency input tube 2. The grid of tube 2 is returned to the tap 3 on a "resistance pot" 4 determining the quiescent bias of tube 2. The amplified signal appearing across output resistance 5 in the plate circuit of tube 2 is applied to the grid of low impedance output tube 6, the grid of which is returned to ground through resistance 7. The signal applied to the grid of tube 6 reappears across resistance 8 in the cathode circuit of tube 6. The latter tube operates as a cathode-follower thereby providing the low output impedance required to control the screen grid of the modulated radio frequency power or carrier input amplifier 9.

This requirement results from the variability of the impedance presented to the modulation circuit by the screen grid of tube 9, which may vary between infinity and several thousand ohms. It is apparent, therefore, that the screen grid potential will follow the potential on grid potentiometer 7 of tube 6 very closely. In this way the instantaneous value of power generated by carrier input tube 9 depends upon the signal condition at the grid of tube 6.

In case no modulating signal enters upon tube 2, the plate potential is determined by the setting of potentiometer or resistance "pot" 4. By varying the setting of tap 3 on potentiometer 4, the voltage on the screen grid of tube 9 can be varied over a considerable range.

Thus, a non-modulation residual carrier level is established.

In case audio signals are applied to the circuit, a similar, amplified signal appears at the screen grid of tube 9, modulating the carrier. As the amplitude of the input signal increases, the residual carrier becomes one hundred percent modulated. When this point is reached, the grid of tube 2 begins to draw current, grid clamping in the input signal. Therefore, increasing input signals develop a D. C. shift of plate voltage in tube 2 proportional to the signal strength of the modulating signal. As a result, the screen grid voltage of tube 9 also increases proportionately, and the average carrier level will be raised as a function of modulating signal strength.

This process will be terminated or limited when the input signal exceeds level causing plate current cutoff in tube 2 on negative peaks. Consequently, the maximum possible excursion of the potential on the grid of tube 6 will vary between fixed limits determined by resistances 4 and 7, and the value of resistance 10. The latter resistance determines the most negative potential to which the plate of tube 2 can be driven, and thereby makes it possible to adjust the circuit so that reduction of the output carrier to zero level is prevented regardless of type or amplitude of input signal. As a result, there is no possibility of over-modulating the carrier.

While the circuit diagram of Fig. 1 shows the negative supply voltages furnished from a fixed source, alternate arrangement as shown in Fig. 2 shows the negative voltages self-derived or derived at point 11 from the grid leak bias developed by tube 9.

Such arrangement is feasible since in a practical case the total D. C. current requirement of the modulating signals has been found approximately equal to the grid current required by tube 9.

Glow tube 12 serves to stabilize the negative supply voltage.

Generally speaking the following sequence of events takes place when audio signals enter the modulator:

As the A. F. signal increases in amplitude, the degree of modulation of the residual carrier rises to approximately 95%. Further increases in audio level raise the average carrier correspondingly and in such a manner that the negative modulation peaks always remain clamped to a 3–5% total carrier level. Hence overmodulation is averted.

Continued rise in audio level will produce similar increases in carrier level up to the point where the positive R. F. peak excursion is equal to a new maximum level; this level is determined by the highest positive voltage to which the screen-grid of the modulated tube is permitted to rise and may be considerably in excess of that reached during standard type of operation of the same stage.

The level now attained corresponds to 100% modulation of the entire carrier power. Further increases in audio level will result in both negative and positive peak-clipping.

D. C. coupling throughout the modulator up to the R. F. power amplifier screen-grid produces clean, high-level clipping without the D. C. transient distortion frequently associated with clipping arrangements employing reactive circuit elements. A. F. harmonics of higher order, generated by the clipping action, are suppressed by the screen-grid by-pass capacitor, while modulation linearity is maintained through the low-impedance cathode-follower drive of the screen-grid, all this in accordance with the invention.

In order to compare the overall efficiency of standard type of plate-modulation with that of the invention, it is necessary to take into consideration the duty cycle of the information such as speech to be transmitted.

For the plate-modulated stage the following conditions exist assuming a class B modulation operating only during the duty cycle with 50% efficiency:

$$P_{in}=\frac{P_{out}}{0.66}+\frac{0.5P_{out}}{0.5\times0.66}D$$
$$=P_{out}\frac{(1+D)}{0.66}$$

at 100% modulation;

where $P_{in}$=total D. C. power input to the system
$P_{out}$=no-modulation carrier power (or average power at 100% modulation)
$D$=duty cycle For the present modulation system:

$$P_{in}=\frac{P_{out}}{0.33K}(1-D)+\frac{1.5P_{out}}{0.5}D$$
$$=P_{out}[3/K+(3-3/K)D]$$

where $P_{in}$=total D. C. power input to the system
$P_{out}$=effective no-modulation power output
$K$=factor proportional to residual carrier level at no-modulation (see Table 4)

Referring to Fig. 3, it will be seen that a considerable reduction in the size of the power supply components is achieved by reducing the residual carrier level as far as practicable in a particular type of communications service. If the normal range of duty cycle D is assumed to be in the region of ¼ to ⅛ a size reduction of 100% is feasible. In general, this represents a similar decrease in component weight.

A choice of average design center values for D and K as apparent for example from Fig. 4, should take one additional factor into consideration, i. e. plate dissipation in the plate modulated stage.

In the tube modulated in accordance with the invention, $$P_{pd}=0.66\ \text{(unmodulated input power)}\ (1-D)+0.5D\ \text{(mod. inp. power)}$$
$$=0.66\ P_{out}/K\ (1-D)\ +0.5D\ (1.5P_{out})$$
$$P_{pd}=0.66/K+(0.75-0.66K)D$$

which is plotted in Fig. 5.

Figure 5 indicates that plate dissipation varies between 21% and 31% of effective no-modulation carrier power output (or 0.75 of total generated power output at 100% modulation) for $D=\frac{1}{4}$ and 100% modulation during the modulation period. Since plate dissipation in a plate modulated stage is 33% of the total generated power, or approximately 34% of the carrier power for $D=\frac{1}{4}$ and 100% modulation, the two systems are roughly equivalent for conservative values of K and D.

This means that the identical tube or tubes used for plate modulation will develop at least equal or greater power output in a stage according to the invention, resulting in a further effective weight reduction per watt generated.

In another feature of the invention, peak-clipping of the speech waveform can be utilized to aid in materially raising the average modulation level Approximately 10–15 db of clipping are normally desirable, and will increase the effectiveness of the transmission several hundred percent, while maintaining voice quality adequate for communications work.

The success of any speech-clipping system depends in part on the ability to suppress higher-order harmonics generated in the clipping process. If these were permitted to modulate the carrier, considerable sideband radiation or "splatter" would result. Conventional speech clippers, therefore, incorporate low-pass filters to reduce these A. F. harmonics to acceptable levels.

However, unless clipping is done at a high level, i. e. at the point of modulation injection into the R. F. stage, phase shifts in the audio amplifier stages following the clipper circuit will have the effect of tilting the flat top waveforms developed by the clipper-filter combination, reducing the amount of clipping permissible.

In the present system these difficulties are avoided by obtaining clipping action in the grid and plate circuit of the voltage amplifier driving the cathode follower modulator, to which it is D. C. coupled.

Attenuation, for example, of about 6 db per octave below approximately 400 cycles, is provided by the coupling networks of the microphone preamplifier; this helps to reduce the vowel bass content of normal speech which is largely responsible for the peak excursions of composite speech waveforms.

On a basis of equal performance with standard types of plate modulated system, considerable reduction of size and weight is afforded by the use of the system disclosed herein.

A working model of a complete bandswitching 3–30 megacycle phone and CW transmitter in accordance with the invention, in addition to the R. F. section and modulator has been built of the following integral units:

I. Complete 60 cycle power supply

II. Selectable crystal or V. F. O. control

III. 100 kc. crystal controlled marker oscillator to calibrate V. F. O.

Parts I, II and III were added to increase weight and prove the effects on power source The transmitter was found to deliver an excess of 100 watts to the antenna and to weigh 25 pounds i. e. 50 pounds less than a counterpart employing standard plate modulation.

It will be seen from Figure 3 that two thirds less primary power is reqoired to operate such a transmitter thereby increasing the effectiveness of a communication channel. It is feasible to operate a 250 watt transmitter from a standard six volt car battery. It is also feasible to operate a ten watt transmitter from standard portable radio type dry batteries.

In the subminiature field such a transmitter is ideally suited since there are no iron core transformers incorporated.

From the cost per equipment standpoint a saving of 50% is afforded by the use of the system disclosed herein.

The invention is not limited to the circuits and circuit components shown and described but may be applied with substantially equal effect to any modulating system and any frequency range without exceeding the scope of the invention.

I claim:

1. In combination, a low frequency modulation input tube and a high frequency carrier input tube, the latter having a screen grid; and a low impedance output tube having a grid controlled by the low frequency tube, a cathode controlling said screen grid and an anode coupled to that of said low frequency tube, so as to produce at a modulation exceeding one hundred per cent a direct current shift of the common anode voltage and a variation of the average carrier level in accordance with the strength of the modulating signal, and between fixed limits depending upon the grid resistances of said low frequency tube and said low impedance tube.

2. System according to claim 1 wherein the grid of the low frequency tube is returned to a predetermined negative potential over an adjustable cathode resistance determining the quiescent value of said low frequency tube.

3. System according to claim 1 wherein the impedance of the output of said low impedance tube is low compared to the impedance of the screen of said high frequency tube so as to cause the grid-screen potential of said tube to vary in accordance with the grid return resistance of said low impedance tube.

4. System according to claim 1 wherein the maximum possible excursion of the potential on the grid of the low impedance tube varies between limits determined by a resistance in the output circuit of the low frequency tube, the grid and cathode resistance of the low frequency tube; the latter determining the most negative potential to which the plate of said low frequency tube is driven thereby to prevent overmodulation of the carrier.

5. System according to claim 1 wherein the negative supplied voltages are derived from the grid leak bias developed by the high frequency tube; the total direct current requirement of the modulating signals being approximately equal to the grid current required by the high frequency tube.

References Cited in the file of this patent

UNITED STATES PATENTS

| | | |
|---|---|---|
| 1,961,937 | McCutchen | June 5, 1934 |
| 2,043,255 | Marks | June 9, 1936 |
| 2,519,256 | Lee | Aug. 15, 1950 |
| 2,572,832 | Bernard | Oct. 30, 1951 |